(12) United States Patent
Jeon

(10) Patent No.: US 11,401,613 B2
(45) Date of Patent: *Aug. 2, 2022

(54) APPARATUS FOR MANUFACTURING OXYGEN WATER OR HYDROGEN WATER

(71) Applicant: FOURL DESIGN CO., LTD., Gyeonggi-do (KR)

(72) Inventor: Suk Ho Jeon, Gyeonggi-do (KR)

(73) Assignee: FOURL DESIGN CO., LTD., Gyeonggi-do (KR)

( * ) Notice: Subject to any disclaimer, the term of this patent is extended or adjusted under 35 U.S.C. 154(b) by 487 days.

This patent is subject to a terminal disclaimer.

(21) Appl. No.: 16/331,344

(22) PCT Filed: Sep. 8, 2017

(86) PCT No.: PCT/KR2017/009903
§ 371 (c)(1),
(2) Date: Mar. 7, 2019

(87) PCT Pub. No.: WO2018/048260
PCT Pub. Date: Mar. 15, 2018

(65) Prior Publication Data
US 2019/0360109 A1    Nov. 28, 2019

(30) Foreign Application Priority Data

Sep. 8, 2016 (KR) .................. 10-2016-0115923

(51) Int. Cl.
*C25B 9/00* (2021.01)
*C25B 15/00* (2006.01)
(Continued)

(52) U.S. Cl.
CPC ............... *C25B 1/04* (2013.01); *B01D 53/04* (2013.01); *C02F 1/46104* (2013.01); *C02F 1/68* (2013.01);
(Continued)

(58) Field of Classification Search
CPC .. C25B 1/04; C25B 9/00; C25B 15/00; C25B 15/02; C25B 1/02; C25B 1/00; C25B 9/17; C25B 9/65; C25B 15/08
See application file for complete search history.

(56) References Cited

U.S. PATENT DOCUMENTS

| 5,401,371 A | 3/1995 | Oshima et al. |
| 2003/0024828 A1 | 2/2003 | Kondo et al. |

(Continued)

FOREIGN PATENT DOCUMENTS

| CN | 1172770 A | 2/1998 |
| CN | 101519254 A | 9/2009 |

(Continued)

OTHER PUBLICATIONS

Huang Wei et al., "Good water drinks healthy electrolyzed reduced water", Jan. 2014, pp. 87-91, South China University of Technology Press.

(Continued)

*Primary Examiner* — Zulmariam Mendez
(74) *Attorney, Agent, or Firm* — IP Legal Services, LLC

(57) ABSTRACT

The present invention relates to an apparatus for manufacturing oxygen water or hydrogen water. The apparatus for manufacturing oxygen water or hydrogen water is configured such that oxygen or hydrogen generated from a device for generating oxygen and hydrogen by electrolyzing water is supplied to water using a fluid pump for manufacture of oxygen water or hydrogen water. The apparatus is configured to easily, quickly, and effectively manufacture oxygen water or hydrogen water in a plastic water bottle by dissolving high purity oxygen or hydrogen in source water in the bottle directly. Accordingly, by drinking oxygen water or hydrogen water manufactured thereby, fresh oxygen is supplied to the body, and hydrogen is also supplied to the body (Continued)

and removes harmful reactive oxygen species or reactive carbon species, thereby enabling a healthy life.

5 Claims, 8 Drawing Sheets

(51) Int. Cl.
   *C25B 1/04*       (2021.01)
   *B01D 53/04*      (2006.01)
   *C02F 1/461*      (2006.01)
   *C02F 1/68*       (2006.01)
   *C25B 15/02*      (2021.01)
   *C25B 9/17*       (2021.01)
   *C02F 103/02*     (2006.01)

(52) U.S. Cl.
   CPC ............ *C25B 9/17* (2021.01); *C25B 15/02* (2013.01); *B01D 2253/102* (2013.01); *B01D 2256/16* (2013.01); *B01D 2257/106* (2013.01); *C02F 2103/026* (2013.01); *C02F 2201/46145* (2013.01); *C02F 2209/40* (2013.01); *C02F 2209/42* (2013.01)

(56) References Cited

U.S. PATENT DOCUMENTS

| | | |
|---|---|---|
| 2008/0283392 A1 | 11/2008 | Karabin |
| 2011/0064824 A1 | 3/2011 | Lascoste et al. |
| 2015/0197863 A1 | 7/2015 | Kim et al. |
| 2019/0024249 A1 | 1/2019 | Jeon |

FOREIGN PATENT DOCUMENTS

| | | |
|---|---|---|
| CN | 101519255 A | 9/2009 |
| CN | 201473336 U | 5/2010 |
| CN | 101746855 A | 6/2010 |
| CN | 201530737 U | 7/2010 |
| CN | 101910069 A | 12/2010 |
| CN | 201695092 U | 1/2011 |
| CN | 203263065 U | 11/2013 |
| CN | 105433796 A | 3/2016 |
| CN | 105543883 A | 5/2016 |
| CN | 205275285 U | 6/2016 |
| CN | 106830215 A | 6/2017 |
| JP | 2002-282871 A | 10/2002 |
| JP | 2005-111356 A | 4/2005 |
| JP | 2011-092886 A | 5/2011 |
| JP | 2015-131295 A | 7/2015 |
| JP | 3201284 U | 12/2015 |
| JP | 3209751 U | 4/2017 |
| JP | 2018-529838 A | 10/2018 |
| KR | 10-0146185 B1 | 7/1998 |
| KR | 10-2004-0097046 A | 11/2004 |
| KR | 10-2004-0103291 A | 12/2004 |
| KR | 10-2006-0045714 A | 5/2006 |
| KR | 10-2009-0059214 A | 6/2009 |
| KR | 10-2010-0004219 A | 1/2010 |
| KR | 10-2014-0067306 A | 6/2014 |
| KR | 10-1575164 B1 | 12/2015 |
| KR | 10-2016-0006655 A | 1/2016 |
| KR | 10-2016-0033467 A | 3/2016 |
| KR | 10-2016-0041550 A | 4/2016 |
| KR | 10-1609875 B1 | 4/2016 |
| WO | 2017/018809 A1 | 2/2017 |

OTHER PUBLICATIONS

The State Intellectual Property Office of People's Republic of China, Office Action of corresponding CN Patent Application No. 201780054979.2, dated May 20, 2021.
The State Intellectual Property Office of People's Republic of China, Office Action of CN Patent Application No. 201880051013.8, dated Dec. 24, 2021.
The State Intellectual Property Office of People's Republic of China, Office Action of corresponding CN Patent Application No. 201780054979.2, dated Dec. 3, 2021.

APPARATUS FOR MANUFACTURING OXYGEN WATER OR HYDROGEN WATER

CROSS REFERENCE TO RELATED APPLICATIONS

This application is a National Stage Patent Application of PCT International Patent Application No. PCT/KR2017/009903 (filed on Sep. 8, 2017) under 35 U.S.C. § 371, which claims priority to Korean Patent Application No. 10-2016-0115923 (filed on Sep. 8, 2016), the teachings of which are incorporated herein in their entireties by reference.

TECHNICAL FIELD

The present invention relates to an apparatus for manufacturing oxygen water or hydrogen water. More particularly, the present invention relates to an apparatus for manufacturing oxygen water or hydrogen water, the apparatus being configured such that water in a plastic water bottle is supplied as a source water without need of an additional water supply, circulated, and electrolyzed with a device for generating oxygen and hydrogen to generate high purity oxygen and hydrogen such that the generated oxygen or hydrogen is infused into water in the plastic water bottle whereby it is easy to carry the plastic water bottle and drink oxygen water dissolved with oxygen or hydrogen water dissolved with hydrogen.

BACKGROUND ART

Oxygen is inhaled into a human body through respiration and then supplied to each organ of the human body by means of blood. The supplied oxygen is consumed for brain activities and kinetic energy.

Oxygen consumption in a living body is significantly different in each organ. As an example, the brain consumes more oxygen than muscle does.

Among all viscera and organs, the brain consuming a largest amount of oxygen has a weight of merely 1.4 kg which is just 2% of the body weight, but it consumes about 25% of total oxygen consumption of the entire body.

Since the brain does not have a material such as myoglobin capable of storing oxygen to some extent as muscle, the brain immediately consumes all of the supplied oxygen.

If inhaled air has no oxygen, a partial pressure of oxygen required by pulmonary blood does not occur and thus there may be a risk that just one breath of oxygen-free air causes loss of consciousness.

Oxygen performs oxidization in a human body and helps resist infectious microbes and pathogens. A human being cannot live unless oxygen is continuously supplied to every cell of the body. This action is performed by the heart and a pair of lungs. The pair of lungs has about seven hundred million alveoli to supply oxygen to blood and the blood is supplied to everywhere in the human body by means of a pumping action of the heart.

The blood of most modern people is acidified due to lack of exercise and intake of harmful food, and cholesterol adheres to blood vessels such that the flow of blood is disturbed, which becomes a source of many adult diseases. However, weakened functions of the human body can be effectively recovered through supply of fresh oxygen.

As an example of an apparatus for producing water containing a large amount of oxygen, there is "apparatus for producing oxygen water" disclosed in Korean Patent Application No. 10-2003-0034755, which is owned by the present inventor.

In the apparatus for producing oxygen water, oxygen is generated by a device for generating oxygen using three methods, i.e., a PSA method, a membrane method, and a flat membrane method, and then oxygen is rapidly dissolved in water to produce oxygen water.

However, the above-mentioned conventional apparatus has a complicated oxygen producing process, and moisture generated when a fluid pump sucks, compresses, and then supplies air to a nozzle affects zeolite existing in the nozzle, resulting in abrupt deterioration of oxygen purity when oxygen is generated. In addition, noise and vibration generated from the fluid pump may cause stress to a user and disturb sleep, and bacteria may propagate therein.

Recently, an oxygen generating apparatus using electrolysis has been developed and used. However, the apparatus has disadvantages in that much attention should be paid to handling thereof because the apparatus uses an alkaline electrolyte solution, and a safety problem may occur.

Therefore, in an effort to solve such problems, there is "device for generating oxygen using water" disclosed in Korean Patent Application No. 10-2005-0031091, which is owned by the present inventor. The conventional device produces high purity oxygen by electrolyzing water without using an electrolyte, additives or the like, thereby ensuring convenient operation, noiseless generation, high efficiency, low power consumption, a compact appearance, and safe and easy management due to nonuse of an electrolyte such as alkali.

However, the apparatus for producing oxygen water and an apparatus for producing oxygen water using the device for generating oxygen using water according to the above-described inventions, and other apparatuses for producing oxygen water using various devices for producing oxygen are all individually equipped with a bulky water tank. A user is required to supply source water constantly to the bulky tank or exchange a large water bottle frequently and check the remaining amount of water frequently to replenish water.

In addition, in order to connect and install an individual bulky water tank or water bottle on those apparatuses, the entire volume is increased and the structure is complicated, leading to increase in production cost.

Furthermore, when the supply of water is blocked, the apparatuses can not be used at all.

Of reactive oxygen species (ROS), ROS harmful to the human body (oxygens with strong oxidizing power) are produced in large amount in the human body when exposed to ultraviolet light.

However, not all ROS are harmful to the human body. Examples of ROS include superoxide, hydrogen peroxide, and hydroxyl radicals. ROS, such as superoxide and hydrogen peroxide, which is weak in oxidation, play an important role in human body, such as expansion of blood vessels, neurotransmission, formation of sperm, defense of cancer, and enhancement of immunity.

If all of ROS are removed, it will cause various troubles to the human body. Therefore, research has been continuously conducted on a method of selectively removing ROS of which ones are harmful to the human body due to strong oxidizing power thereof, leading to study on hydrogen water.

The reason why hydrogen is studied is hydrogen does not react with ROS having weak oxidizing power but selectively reduces hydroxyl radicals, which are known as bad ROS and have strong oxidizing power attacking cells or genes.

In addition to ROS, reactive carbon species (RCS) are accumulated unavoidably in the human body due to respiratory stress, food additives, drinking, smoking, intense exercise, ultraviolet rays, etc. When a large amount of RCS is accumulated, the oxidizing action is too strong to oxidize the inside of the human body, which causes aging and disease.

Hydrogen water may remove RCS. When hydrogen enters the human body, hydrogen is decomposed into hydrogen atoms due to reaction with carbon, and the hydrogen atoms combine with excess carbon and are converted into water such that the excess carbon can be discharged outside from the human body.

As described above, devices for generating hydrogen capable of removing ROS and RCS harmful to the human body and apparatuses for producing hydrogen water using the devices for generating hydrogen have been proposed in various other related arts. However, the apparatuses also have problems as do the above-described apparatuses for producing oxygen water.

DISCLOSURE

Technical Problem

Accordingly, the present invention has been made keeping in mind the above problems occurring in the related art, and an objective of the present invention is to propose an apparatus for manufacturing oxygen water or hydrogen water, the apparatus manufacturing oxygen water or hydrogen water by using a fluid pump sucking and discharging oxygen or hydrogen generated from a device (electrolytic cell) generating oxygen and hydrogen by electrolyzing water.

Here, the apparatus for manufacturing oxygen water or hydrogen water has a remarkable structure capable of using water in a plastic water bottle as a source water without need of an additional water supply and capable of manufacturing oxygen water or hydrogen water in the bottle directly and quickly such that it is easy and efficient to use the apparatus.

In addition, another objective of the present invention is to provide to an apparatus for manufacturing oxygen water or hydrogen water, the apparatus having a main body 200 that is provided with an analog or a digital electrode changeover switch being connected with a device for generating oxygen and hydrogen and supplying power to a power supply line transferring power to the device in a manner that positive and negative electrodes are switched such that it is possible to selectively manufacture oxygen water or hydrogen water by using a single apparatus, thereby allowing consumers to selectively use the apparatus.

Technical Solution

In order to accomplish the above and other objectives, an apparatus for manufacturing oxygen water or hydrogen water is configured such that oxygen or hydrogen generated from a device for generating oxygen and hydrogen by electrolyzing water is supplied to water using a fluid pump for manufacture of oxygen water or hydrogen water.

When a switch for generating hydrogen water or oxygen water, the switch being provided on a mainboard, is turned on by touch after a cap is engaged with a cap engaging portion of a main body in a state where the cap provided with a nozzle elongated vertically is engaged with a mouth of a plastic water bottle containing water or after the bottle is engaged with the cap in a state where the cap is engaged with the cap engaging portion in advance, the fluid pump pumps water in the bottle through a water intake hole provided in the nozzle of the cap, and water is injected into the bottle through an oxygen/hydrogen discharge hole of the nozzle of the bottle by controlling a solenoid valve to keep circulating water.

In addition, oxygen or hydrogen is generated while water sucked by the fluid pump is steadily supplied to the device for generating oxygen and hydrogen by the solenoid valve and a level sensor. The fluid pump pumps generated oxygen or hydrogen to discharge through the oxygen/hydrogen discharge hole of the nozzle of the cap by controlling the solenoid valve.

Accordingly, oxygen water or hydrogen water is directly manufactured in the bottle using water in the bottle as source water.

Advantageous Effects

The apparatus for manufacturing oxygen water or hydrogen water of the present invention can be manufactured to have small volume. The apparatus can easily, quickly, and effectively manufacture oxygen water or hydrogen water in the plastic water bottle by using water in the bottle as a source water and dissolving high purity oxygen or hydrogen in water in the bottle.

In addition, according to the present invention, the main body is provided with a conventional analog or a digital electrode changeover switch being connected with the device for generating oxygen and hydrogen and supplying power to a power supply line transferring power to the device in a manner that positive and negative electrodes are switched such that it is possible to selectively manufacture oxygen water or hydrogen water by using a single apparatus, thereby maximizing convenience in use.

Accordingly, the present invention is groundbreaking in that the apparatus manufactures oxygen water or hydrogen water in which high purity oxygen or hydrogen is dissolved whenever a user needs. As the user drinks oxygen water or hydrogen water manufactured thereby, fresh oxygen is supplied to the body. In addition, hydrogen is also supplied to the body and removes harmful reactive oxygen species or reactive carbon species, thereby enabling a healthy life.

DESCRIPTION OF DRAWINGS

FIG. 1 is a perspective view of the apparatus in an assembled state;

FIG. 2 is a partially exploded rear perspective view of the apparatus;

FIG. 3 is a schematic view illustrating an internal structure of a main body of the apparatus;

FIG. 4 is a perspective view of a cap of a plastic water bottle and the main body of the apparatus in dismantled state viewed from the top;

FIG. 5 is a perspective view of the cap of the plastic water bottle and the main body of the apparatus in dismantled state viewed from the bottom;

FIG. 6 is a side sectional view illustrating a state in which the plastic water bottle is combined with the main body of the apparatus by the cap; and FIG. 7 is an enlarged sectional view of a main portion of FIG. 6.

BEST MODE

Figure 1:
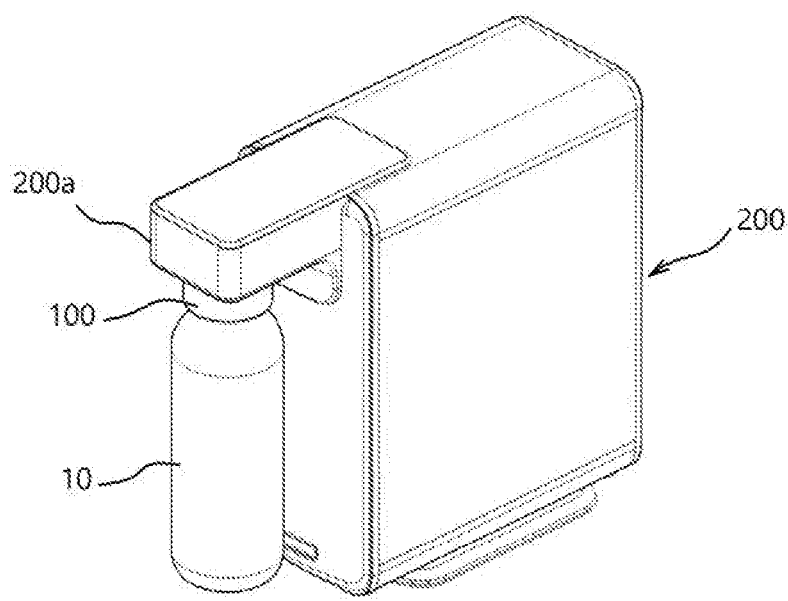
FIGS. 1 to 7 are views illustrating an apparatus for manufacturing oxygen water or hydrogen water according to an embodiment of the present invention, in detail.
Figure 2:
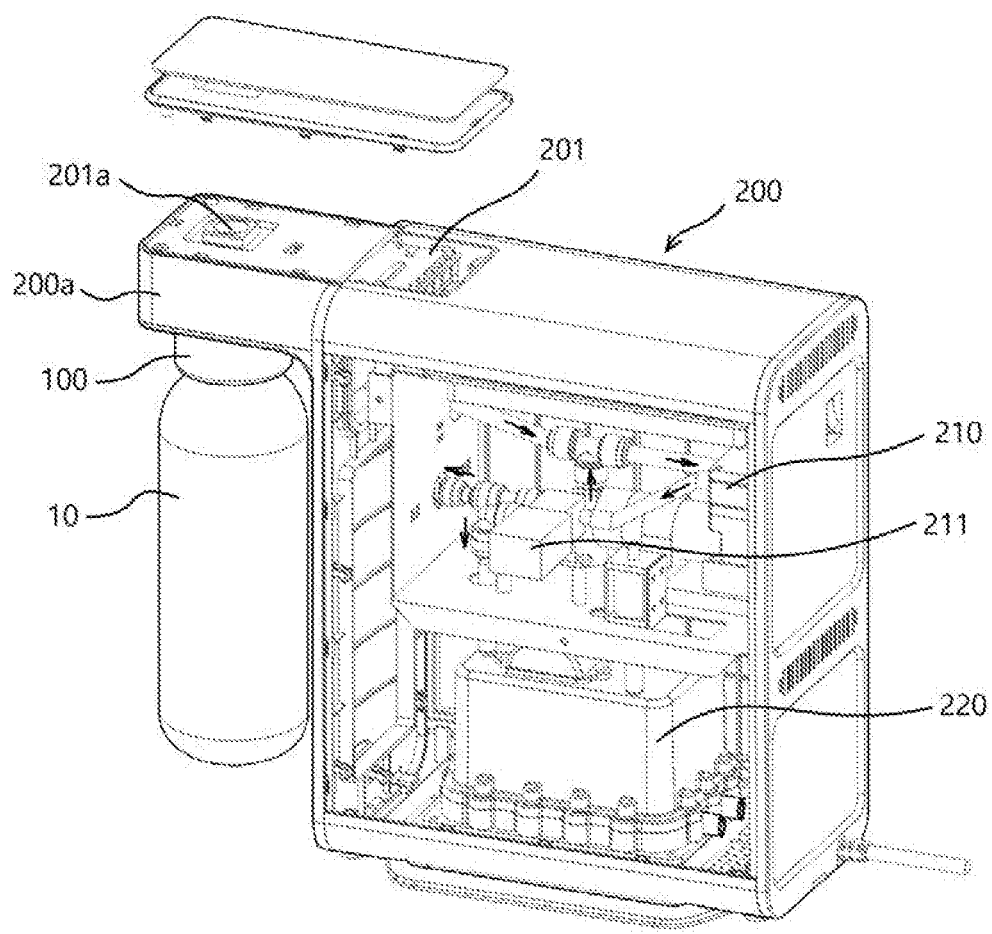
Figure 3:
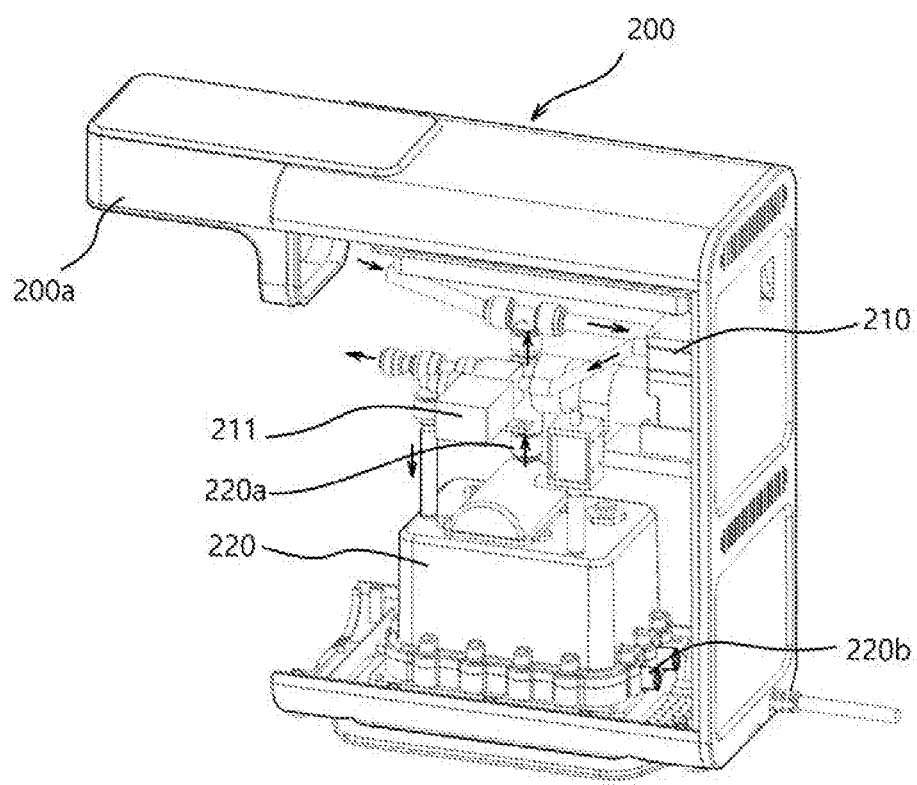
Figure 4:
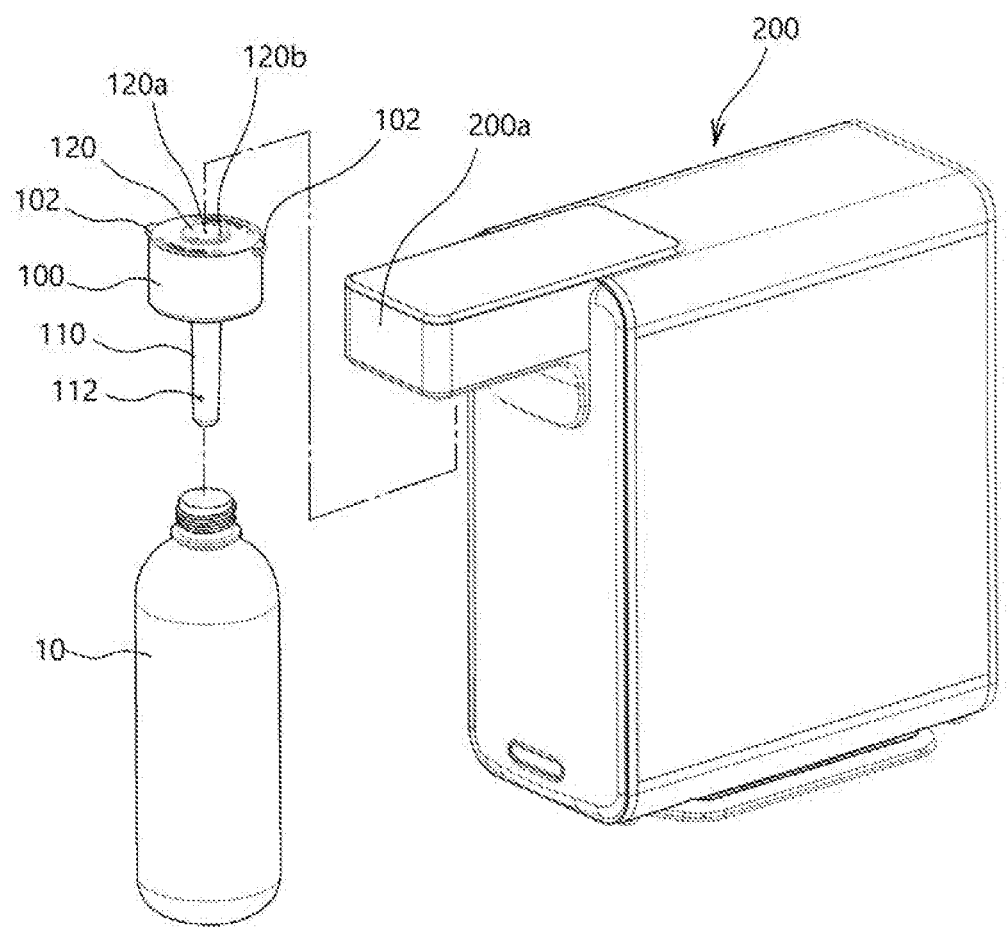
Figure 5:
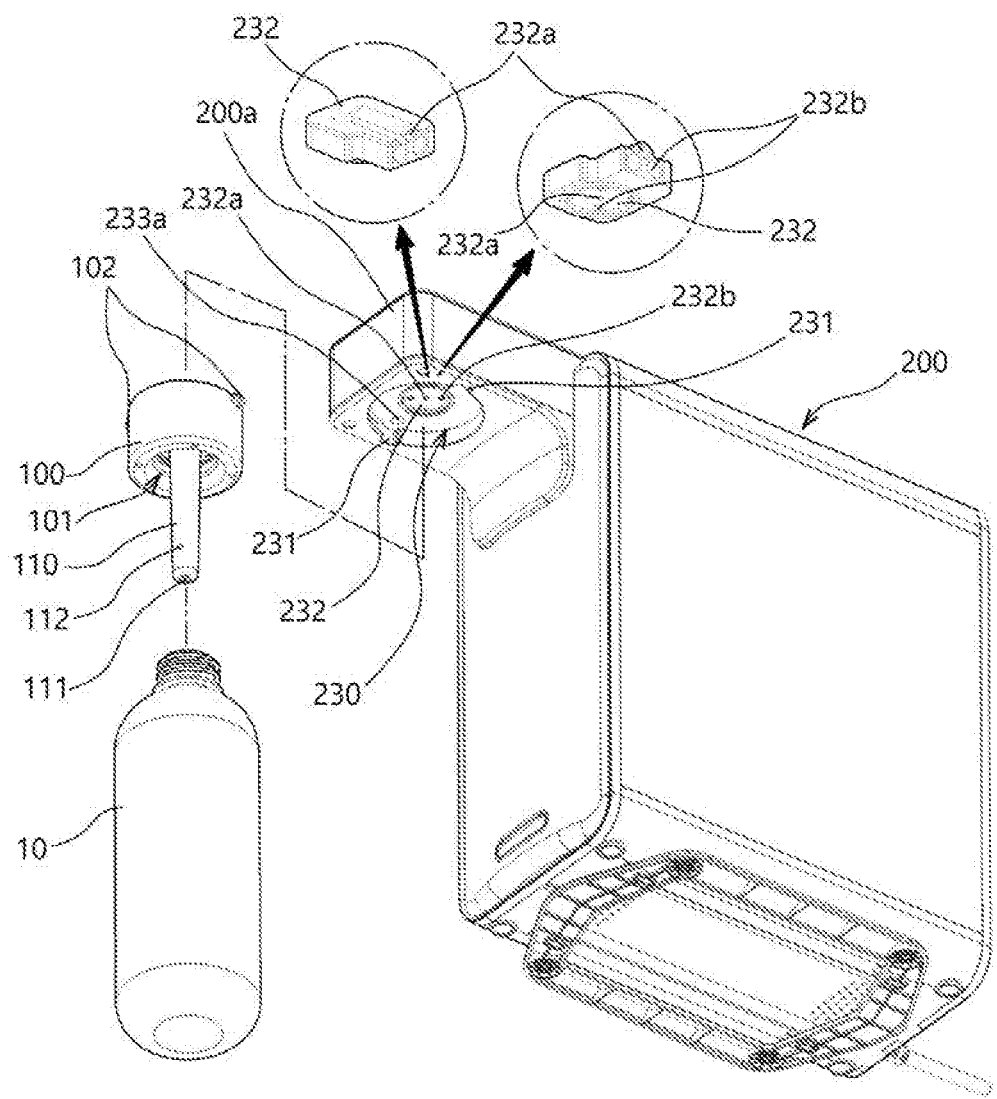
Figure 6:
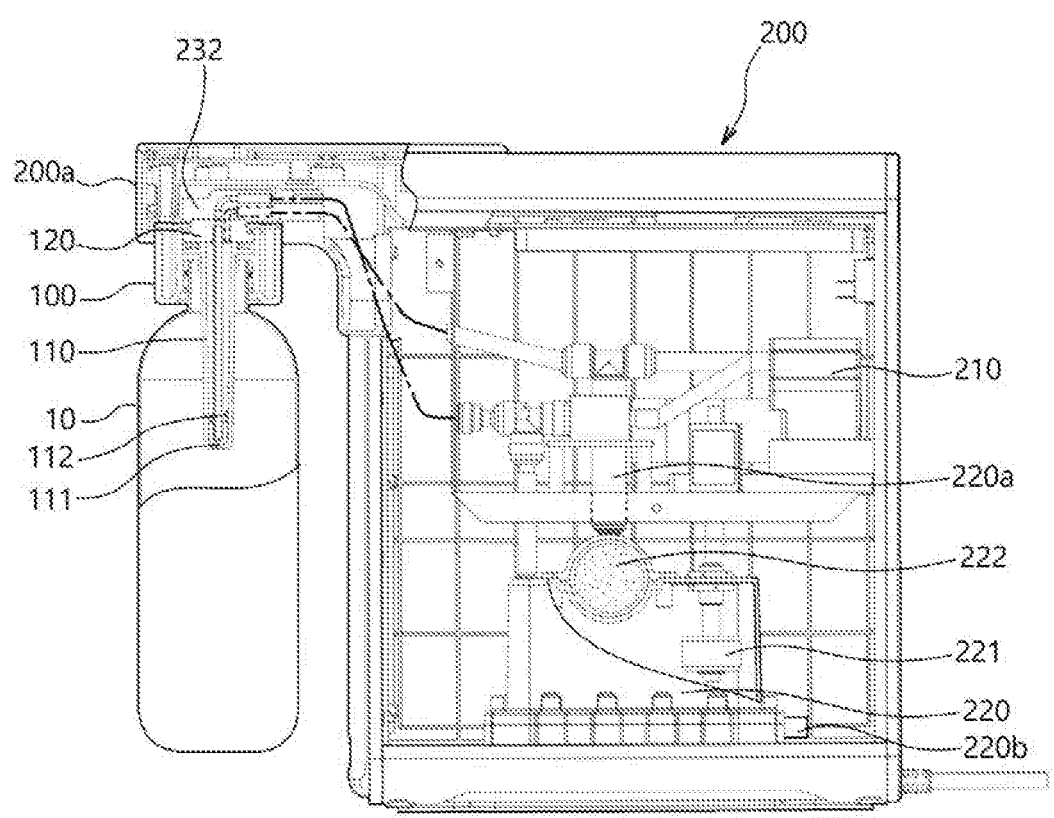
Figure 7:
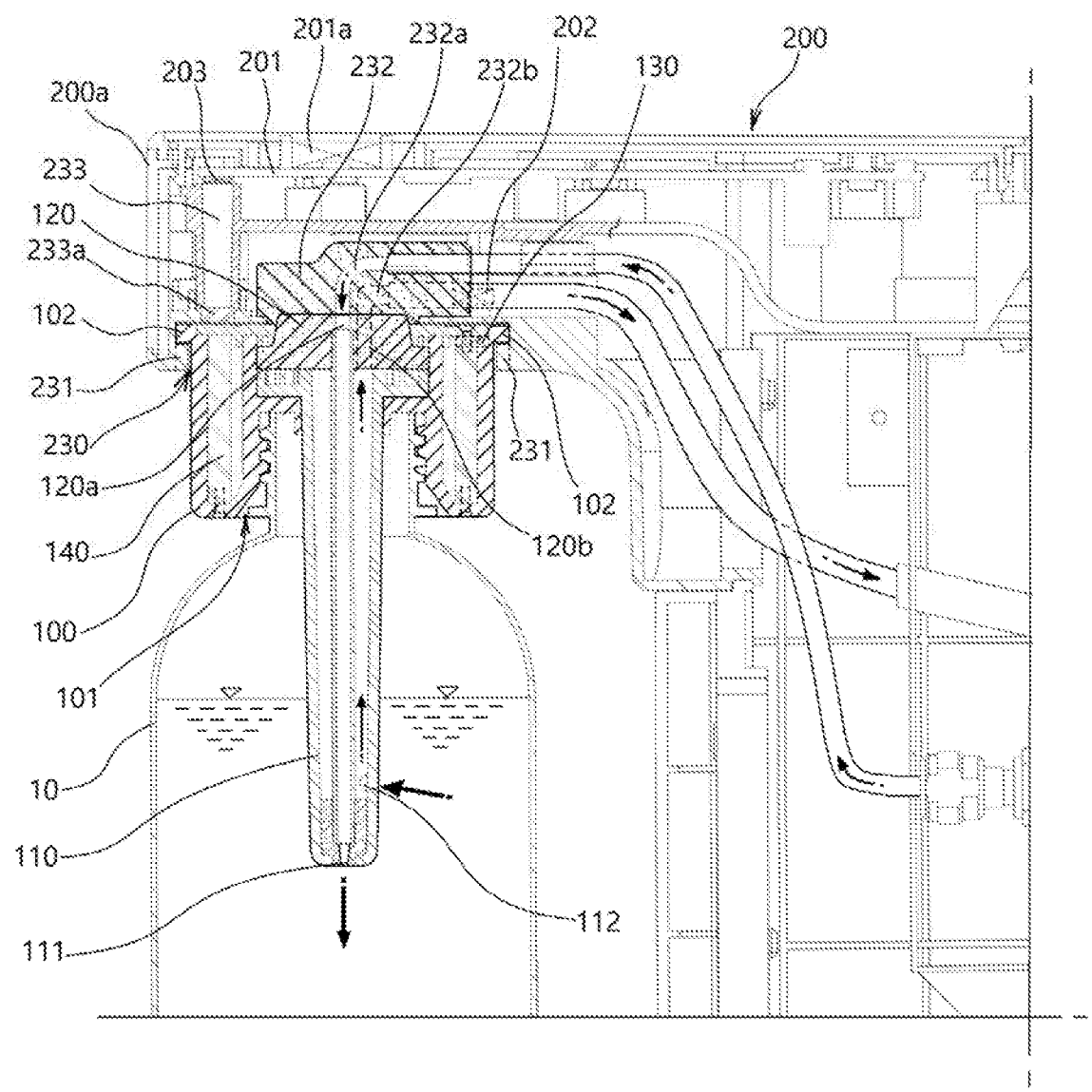

Hereinafter, embodiments of the present invention will be described with reference to FIGS. 1 to 8. It should be understood that the embodiment of the present invention may be changed to a variety of embodiments and the scope and spirit of the present invention are not limited to the embodiment described hereinbelow. It is to be noted that, when the functions of conventional elements and the detailed description of elements related with the present invention may make the gist of the present invention unclear, a detailed description of those elements will be omitted. In addition, it should be understood that the shape and size of the elements illustrated in the drawings may be exaggeratedly drawn to provide an easily understood description of the structure of the present invention.

An apparatus for manufacturing oxygen water or hydrogen water using a device for generating oxygen and hydrogen according to the present invention is configured such that oxygen or hydrogen generated from a device 220 for generating oxygen and hydrogen is pumped by a fluid pump 210 and supplied to water in order to manufacture oxygen water or hydrogen water.

When a switch 201a for generating hydrogen water or oxygen water, the switch 201a being provided on a mainboard 201, is turned on by touch after a cap 100 is engaged with a cap engaging portion 230 of a main body 200 in a state where the cap 100 provided with a nozzle 110 elongated vertically is engaged with a mouth of a plastic water bottle 10 containing water or after the bottle 10 is engaged with the cap 100 in a state where the cap 100 is engaged with the cap engaging portion 230 in advance, a fluid pump 210 pumps water in the bottle 10 through a water intake hole 112 provided in the nozzle 110 of the cap 100, and water is injected into the bottle 10 through an oxygen/hydrogen discharge hole 111 of the nozzle 110 of the bottle 10 by controlling a solenoid valve 211 to keep circulating water.

During the water circulation, oxygen or hydrogen is continuously generated while the device 220 for generating oxygen and hydrogen is steadily supplied with water by controlling the solenoid valve 211 in response to a level detection signal of a level sensor 221 provided in the device 220 for generating oxygen and hydrogen, and the fluid pump 210 pumps oxygen or hydrogen to discharge through the oxygen/hydrogen discharge hole 111 of the nozzle 110 of the cap 100 by controlling the solenoid valve 211.

Accordingly, water in the bottle 10, which is a source water, is moved into the main body 200 equipped with the device 220, wherein the water is electrolyzed to generate oxygen and hydrogen, and the generated oxygen or hydrogen is directly supplied back into the bottle 10 to manufacture oxygen water or hydrogen water in the bottle 10.

In the present invention, the main body 200 is provided with a conventional analog or a digital electrode changeover switch 201b being connected with the device 220 and supplying power to the device 220 in a manner that positive and negative electrodes are switched.

In addition, a side of a hydrogen outlet 220b of the device 220 is provided with an ozone removing filter 223 made of a carbon material.

Accordingly, it is possible to selectively manufacture oxygen water or hydrogen water by using a single apparatus.

Furthermore, when switching the positive and negative electrodes using the electrode changeover switch 201b to discharge hydrogen through an oxygen outlet 220a and discharge oxygen through the hydrogen outlet 220b, the ozone removing filter 223 may stably filter out ozone generated together with oxygen and ozone compounds in which ozone is combined with various organic and inorganic substances contained in water, such as calcium (Ca), magnesium (Mg), and silicon (Si).

Hereinafter, an embodiment of the present invention will be described in more detail.

The apparatus for manufacturing oxygen water or hydrogen water using the device for generating oxygen and hydrogen according to the present invention includes: the cap 100 with which a plastic water bottle is engaged; and the main body 200 with which the cap 100 is engaged.

That is, the apparatus for manufacturing oxygen water or hydrogen water using the device for generating oxygen and hydrogen according to the present invention includes: the cap 100 having a bottle mouth-engaging portion 101 with which a mouth of the bottle 10 is engaged, and the nozzle 110 elongated vertically and provided with the oxygen/hydrogen discharge hole 111 and the water intake hole 112; and the main body 200 including: the device 220 generating oxygen and hydrogen by electrolyzing water;

the fluid pump 201 provided to be connected with the device 220 for generating oxygen and hydrogen, pumping water to supply water to the device 220 through the solenoid valve 211 in response to the level detection signal of the level sensor 221 provided in the device 220, and communicating with the device 220 through the oxygen outlet 220a to supply oxygen or communicating through the hydrogen outlet 220b to supply hydrogen such that the fluid pump 210 supplies oxygen or hydrogen, which is generated from the device 220, together with water through the solenoid valve 211; and the cap engaging portion 230 provided below a protrusion head 200a and having an oxygen/hydrogen supply passage 232a receiving oxygen or hydrogen together with water from the fluid pump 210 and a water discharge passage 232b through which water is discharged.

In the present invention, the cap 100 with which the bottle 10 is engaged is provided with fastening protrusions 102 on opposite sides of an outer circumference thereof and provided with a nozzle cap 120 in the upper center portion thereof, the nozzle cap 120 being made of silicon and having an oxygen/hydrogen supply passage 120a and a water discharge passage 120b.

In addition, the cap engaging portion 230 has cap fastening recessions 231 configured in an inner wall of an inlet thereof and a nozzle cap-contact portion 232 which is made of silicon, configured on the top surface of the inlet thereof, and has the oxygen/hydrogen supply passage 232a and the water discharge passage 232b.

Accordingly, when the fastening protrusions 102 of the cap 100 are inserted into the cap fastening recessions 231 of the cap engaging portion 230 and rotated, the cap 100 is engaged with the cap engaging portion 230, and the oxygen/hydrogen supply passage 120a and the water discharge passage 120b of the nozzle cap 120 are connected and communicate with the oxygen/hydrogen supply passage 232a and the water discharge passage 232b of the nozzle cap-contact portion 232, respectively, whereby transfer of water and transfer of oxygen or hydrogen are achieved.

In the present invention, a magnet 130 is provided on a side of the cap 100 with which the bottle 10 is engaged.

In addition, a magnetic sensor 202 is provided above the cap engaging portion 230 and connected to the mainboard 201.

Accordingly, when engaging the cap 100 with the cap engaging portion 230, the magnetic sensor 202 senses proximity of the magnet 130 and transfers a signal to the mainboard 201 to inform that the bottle 10 is engaged with the main body 200 by lamp lighting or signal sound.

In the present invention, the cap engaging portion 230 is provided with a light projection hole 233 having a projection window 233a to project light of an LED lamp 203 provided on the mainboard 201, and the cap 100 is provided with a light guide plate 140.

Accordingly, when engaging the bottle 10 with the main body 200 or in a process of manufacturing oxygen water, light generated when the LED lamp 203 is turned on is transmitted through the light projection hole 233 to the light guide plate 140 whereby the cap 100 is illuminated.

On the other hand, when separating the bottle 10 from the main body 200 or when manufacture of oxygen water or hydrogen water is completed, the LED lamp 203 is turned off whereby an operation state of the apparatus is easily informed to the outside by the cap 100.

The level sensor 221 senses the water level in the device 220, and when it is determined that water is required, a flow direction in the solenoid valve 211 is switched to supply water to the device 220. Various types of level sensors 221 may be used, but in the present invention, a float sensor is used to minimize a volume of the device 220.

An undescribed reference numeral 222 is an ozone removing filter made of a carbon material and mounted on the device 220 as an integrated body. The ozone removing filter 222 is supplied with ozone generated together with oxygen during the electrolysis of water and ozone compounds in which ozone is combined with various organic and inorganic substances contained in water, such as calcium (Ca), magnesium (Mg), and silicon (Si), through pores (not illustrated) and filters out ozone and ozone compounds to obtain high purity oxygen stably.

Figure 8:
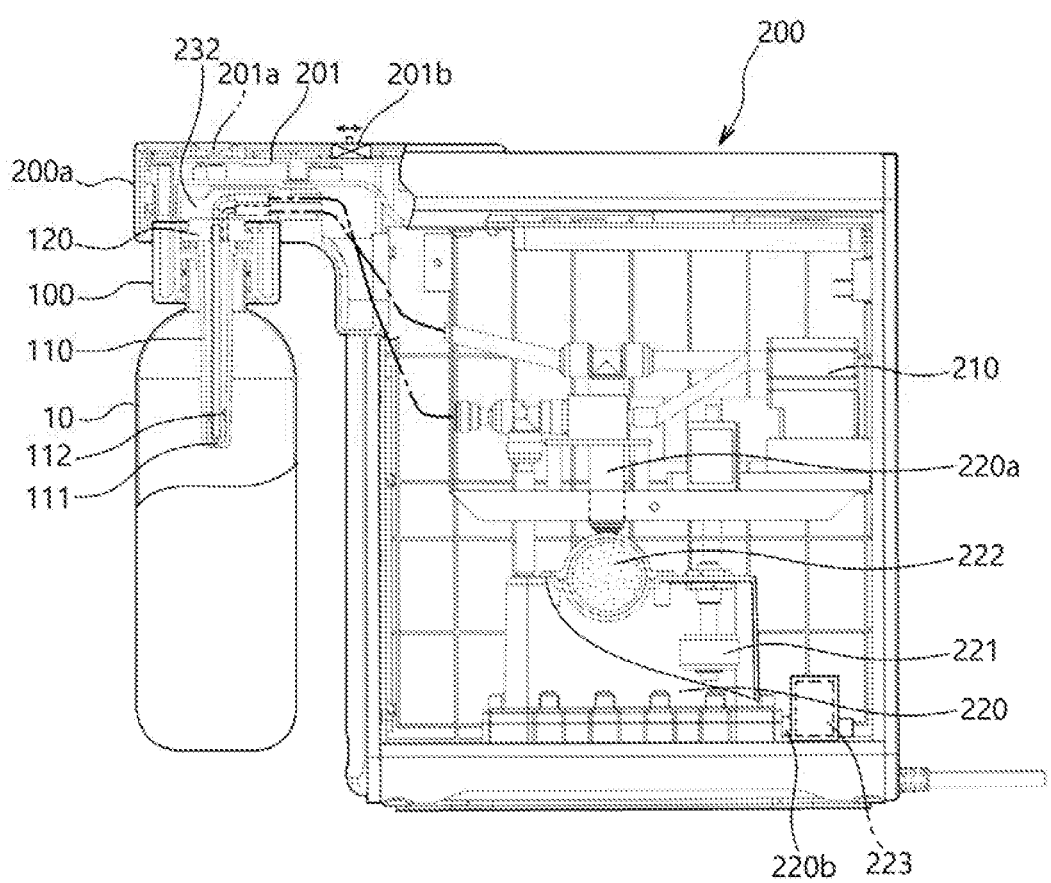
FIG. 8 is a view illustrating an apparatus for manufacturing oxygen water or hydrogen water according to another embodiment of the present invention.

As illustrated in FIG. 8, in the present invention, a main body 200 may be provided with a conventional analog or a digital electrode changeover switch 201b being connected with a device 220 for generating oxygen and hydrogen and supplying power to the device 220 in a manner that positive and negative electrodes are switched.

In addition, a side of a hydrogen outlet 220b of the device 220 is provided with an ozone removing filter 223 made of a carbon material.

Accordingly, it is possible to selectively manufacture oxygen water or hydrogen water by using a single apparatus.

Furthermore, when switching the positive and negative electrodes using the electrode changeover switch 201b to discharge hydrogen through an oxygen outlet 220a and discharge oxygen through the hydrogen outlet 220b, the ozone removing filter 223 may filter out ozone generated together with oxygen and ozone compounds in which ozone is combined with various organic and inorganic substances contained in water, such as calcium (Ca), magnesium (Mg), and silicon (Si), as does the ozone removing filter 222. Accordingly, it is possible to obtain high purity oxygen.

Hereinafter, an operating process of the apparatus for manufacturing oxygen water or hydrogen water of the present invention will be described.

In order to manufacture oxygen water or hydrogen water using the apparatus for manufacturing oxygen water or hydrogen water of the present invention, the mouth of the bottle 10 and the bottle mouth-engaging portion 101 provided at the cap 100 are screwed together to fasten the cap 100.

Then, a lower portion of the nozzle 110 configured to be elongated vertically on the cap 100 is immersed in water so that the oxygen/hydrogen discharge hole 111 and the water intake hole 112 provided at the lower portion of the nozzle 110 are also immersed in water.

In this state, the cap 100 with which the bottle 10 is engaged is required to be fastened to the cap engaging portion 230 provided below the protrusion head 200a of the main body 200. In an embodiment of the present invention, when the fastening protrusions 102 of the cap 100 are inserted into the cap fastening recessions 231 of the cap engaging portion 230 and rotated, the cap 100 is fastened to the cap engaging portion 230.

Since the cap 100 is provided with the nozzle cap 120 in the upper center portion thereof, the nozzle cap 120 being made of silicon and having the an oxygen/hydrogen supply passage 120a and the water discharge passage 120b, and the nozzle cap-contact portion 232 is made of silicon, configured on the top surface of the inlet of the cap engaging portion 230, and has the oxygen/hydrogen supply passage 232a and the water discharge passage 232b, the top surface of the nozzle cap 120 comes into close contact with the bottom surface of the nozzle cap-contact portion 232 such that the oxygen/hydrogen supply passage 120a and the water discharge passage 120b of the nozzle cap 120 are connected and communicate with the oxygen/hydrogen supply passage 232a and the water discharge passage 232b of the nozzle cap-contact portion 232, respectively, whereby transfer of water and oxygen is achieved.

It is obvious that the bottle 10 may be engaged with the cap 100 in a state where the cap 100 is engaged with the cap engaging portion 230 in advance.

After the bottle 10 is installed and connected to the main body 200 and the preparation is completed as described above, the apparatus is operated for a set number of minutes when the switch 201a provided on the mainboard 201 is turned on by touch, and thus oxygen water or hydrogen water is manufactured in the bottle 10.

That is, the fluid pump 210 pumps water in the bottle 10 through the water intake hole 112 provided in the nozzle 110 of the cap 100 to transfer water into the main body 200. Water is injected back into the bottle 10 through the oxygen/hydrogen discharge hole 111 of the nozzle 110 of the bottle 10 by controlling the solenoid valve 211 to keep circulating water.

During the water circulation, when the level sensor 221 provided in the device 220 senses the water level and it is determined that water is required, a flow direction in the solenoid valve 211 is switched to supply water to the device 220. Thus, oxygen or hydrogen is continuously generated. Then, the fluid pump 210 pumps oxygen or hydrogen to discharge through the oxygen/hydrogen discharge hole 111 of the nozzle 110 of the cap 100 by controlling the solenoid valve 211.

Therefore, oxygen or hydrogen is continuously supplied into the bottle 10 and dissolved in water, so that oxygen water or hydrogen water is easily manufactured straight in the bottle 10.

The present invention may be implemented such that a mounting state of the bottle 10 and an operating state of the apparatus for manufacturing oxygen water or hydrogen water is easily informed to the outside in various ways. In an embodiment of the present invention, the magnetic sensor 202 is provided above the cap engaging portion 230, and the magnet 130 is provided on a side of the cap 100 with which the bottle 10 is engaged. Accordingly, when engaging the cap 100 with the cap engaging portion 230, the magnetic sensor 202 senses proximity of the magnet 130 and transfers a signal to the mainboard 201 to inform that the bottle 10 is engaged with the main body 200 by lamp lighting or signal sound.

In addition, in the present invention, the cap engaging portion 230 is provided with the light projection hole 233 to project light of the LED lamp 203 provided on the mainboard 201, and the cap 100 is provided with the light guide plate 140. Accordingly, when engaging the bottle 10 with the main body 200 or in the process of manufacturing oxygen water or hydrogen water, light generated when the LED lamp 203 is turned on is transmitted through the light projection hole 233 to the light guide plate 140 whereby the cap 100 is illuminated.

When separating the bottle 10 from the main body 200 or when manufacture of oxygen water or hydrogen water is completed, the LED lamp 203 is turned off whereby an operation state of the apparatus is easily informed to the outside by the cap 100.

Therefore, by using the apparatus for manufacturing oxygen water or hydrogen water of the present invention, oxygen water or hydrogen water can be easily, quickly, and effectively manufactured in the bottle 10 using water in the bottle 10 as a source water. Therefore, it is possible to live a healthy life by drinking oxygen water or hydrogen water manufactured thereby as occasion demands.

As illustrated in FIG. 8, the main body 200 is provided with a conventional analog or a digital electrode changeover switch 201b being connected with the device 220 and supplying power to the device 220 in a manner that positive and negative electrodes are switched.

In addition, a side of the hydrogen outlet 220b of the device 220 is provided with the ozone removing filter 223 made of a carbon material whereby it is possible to selectively manufacture oxygen water or hydrogen water by using a single apparatus.

Furthermore, when switching the positive and negative electrodes using the electrode changeover switch 201b to discharge hydrogen through the oxygen outlet 220a and discharge oxygen through the hydrogen outlet 220b, the ozone removing filter 223 stably filters out ozone generated together with oxygen and ozone compounds in which ozone is combined with various organic and inorganic substances contained in water, such as calcium (Ca), magnesium (Mg), and silicon (Si). Accordingly, it is possible to use the apparatus of the present invention reliably and easily.

Although the preferred embodiments of the present invention has been described for illustrative purposes with reference to the accompanying drawings, those skilled in the art will appreciate that various modifications, additions and substitutions are possible, without departing from the scope and spirit of the invention as disclosed in the accompanying claims.

INDUSTRIAL APPLICABILITY

The apparatus for manufacturing oxygen water or hydrogen water of the present invention can be manufactured in small volume. The apparatus can easily, quickly, and effectively manufacture oxygen water or hydrogen water in the plastic water bottle by using water in the bottle as a source water and dissolving high purity oxygen or hydrogen in water in the bottle.

In addition, in the present invention, the main body is provided with a conventional analog or a digital electrode changeover switch being connected with the device for generating oxygen and hydrogen and supplying power to a power supply line transferring power to the device in a manner that positive and negative electrodes are switched such that it is possible to selectively manufacture oxygen water or hydrogen water by using a single apparatus, thereby maximizing convenience in use.

Accordingly, the present invention manufactures oxygen water or hydrogen water in which high purity oxygen or hydrogen is dissolved whenever a user needs. As the user drinks oxygen water or hydrogen water manufactured thereby, fresh oxygen is supplied to the body. In addition, hydrogen is also supplied to the body and removes harmful reactive oxygen species or reactive carbon species, thereby enabling a healthy life. Therefore, it is expected that the present invention can be widely used in the fields of drinking water and cosmetics using ozone water and hydrogen water as well as an apparatus for manufacturing oxygen water or an apparatus for manufacturing hydrogen water.

The invention claimed is:

1. An apparatus for manufacturing oxygen water or hydrogen water, the apparatus using a fluid pump to supply oxygen or hydrogen to water for manufacture of oxygen water or hydrogen water, the fluid pump sucking and discharging oxygen or hydrogen generated from a device for generating oxygen and hydrogen by electrolyzing water, wherein, when a switch for generating hydrogen water or oxygen water, the switch being provided on a mainboard, is turned on by touch after a cap is engaged with a cap engaging portion of a main body in a state where the cap having a nozzle elongated vertically is engaged with a mouth of a plastic water bottle containing water or after the bottle is engaged with the cap in a state where the cap is engaged with the cap engaging portion in advance, a fluid pump pumps water in the bottle through a water intake hole provided in the nozzle of the cap to transfer water into the main body, and water is injected into the bottle through an oxygen/hydrogen discharge hole of the nozzle of the bottle by controlling a solenoid valve to keep circulating water, and during the water circulation, oxygen or hydrogen is continuously generated while the device is steadily supplied with water by controlling the solenoid valve in response to a level detection signal of a level sensor provided in the device, and the fluid pump pumps oxygen or hydrogen to discharge through the oxygen/hydrogen discharge hole of the nozzle of the cap by controlling the solenoid valve, such that water in the bottle, which is a source water, is moved into the main body equipped with the device, wherein water is electrolyzed to generate oxygen and hydrogen, and the generated oxygen or hydrogen is supplied back into the bottle to manufacture oxygen water and hydrogen water in the bottle, the cap configured as a separate component, having a bottle mouth-engaging portion with which a mouth of the bottle is engaged, and having the nozzle elongated vertically and provided with the oxygen/hydrogen discharge hole and the water intake hole; and the main body including:

the device generating oxygen and hydrogen by electrolyzing water; the fluid pump provided to be connected with the device, pumping water to supply water to the device through the solenoid valve in response to the level detection signal of the level sensor provided in the device, and communicating with the device through an oxygen outlet to supply oxygen or communicating through a hydrogen outlet to supply hydrogen such that the fluid pump supplies oxygen or hydrogen, which is generated from the device, together with water through the solenoid valve; and the cap engaging portion provided below a protrusion head and having an oxygen/hydrogen supply passage receiving oxygen or hydrogen together with water from the fluid pump and a water discharge passage through which water is discharged.

2. The apparatus of claim 1, wherein the cap is provided with fastening protrusions on opposite sides of an outer circumference thereof and provided with a nozzle cap in the upper center portion thereof, the nozzle cap being made of silicon and having an oxygen/hydrogen supply passage and a water discharge passage, and the cap engaging portion has cap fastening recessions configured in an inner wall of an inlet thereof and a nozzle cap-contact portion made of silicon and having the oxygen/hydrogen supply passage and the water discharge passage on the top surface of the inlet thereof, such that, when the fastening protrusions of the cap are inserted into the cap fastening recessions of the cap engaging portion and rotated, the cap is engaged with the cap engaging portion, and the oxygen/hydrogen supply passage and the water discharge passage of the nozzle cap are connected and communicate with the oxygen/hydrogen supply passage and the water discharge passage of the nozzle cap-contact portion, respectively, whereby transfer of water and transfer of oxygen or hydrogen are achieved.

3. The apparatus of claim 1, wherein a magnet is provided on a side of the cap with which the bottle is engaged, and a magnetic sensor is provided above the cap engaging portion and connected to the mainboard, such that, when engaging the cap with the cap engaging portion, the magnetic sensor senses proximity of the magnet and transfers a signal to the mainboard to inform that the bottle is engaged with the main body by lamp lighting or signal sound.

4. The apparatus of claim 1, wherein the cap engaging portion is provided with a light projection hole having a projection window to project light of an LED lamp provided on the mainboard, and the cap is provided with a light guide plate, such that, when engaging the bottle with the main body or in a process of manufacturing oxygen water or hydrogen water, light generated when the LED lamp is turned on is transmitted through the light projection hole to the light guide plate whereby the cap is illuminated, and when separating the bottle from the main body or when manufacture of oxygen water or hydrogen water is completed, the LED lamp is turned off whereby an operation state of the apparatus is easily informed to the outside by the cap.

5. The apparatus of claim 1, wherein the main body is provided with an analog or a digital electrode changeover switch being connected with the device and supplying power to the device in a manner that positive and negative electrodes are switched, and a side of the hydrogen outlet of the device is provided with an ozone removing filter made of a carbon material, whereby oxygen water or hydrogen water is manufactured selectively by using a single apparatus, and when switching the positive and negative electrodes using the electrode changeover switch to discharge hydrogen through an oxygen outlet and discharge oxygen through the hydrogen outlet, the ozone removing filter filters out ozone generated together with oxygen and filters out ozone compounds in which ozone is combined with inorganic substances contained in water, the substances including but not limited to calcium (Ca), magnesium (Mg), and silicon (Si).

* * * * *